United States Patent [19]

Christiansen

[11] 4,251,693
[45] Feb. 17, 1981

[54] FIXED IMPULSE GENERATOR FOR HOOK SWITCH FLASH

[76] Inventor: Gary F. Christiansen, 4385 Xavier St., Denver, Colo. 80212

[21] Appl. No.: 930,571

[22] Filed: Aug. 3, 1978

[51] Int. Cl.³ ............................................. H04M 1/00
[52] U.S. Cl. ................................ 179/81 R; 179/84 R
[58] Field of Search .................. 179/81 R, 99, 84 R, 179/84 A; 331/165, 166

[56] References Cited

U.S. PATENT DOCUMENTS 4,086,440  4/1978  Hurle ............................ 179/81 R

FOREIGN PATENT DOCUMENTS 2432452  1/1976  Fed. Rep. of Germany ........ 179/81 R Primary Examiner—Bernard Konick
Assistant Examiner—Joseph A. Popek
Attorney, Agent, or Firm—Max L. Wymore

[57] ABSTRACT

A hook switch flash generator to provide consistent, electronically controlled and timed flash signals independent of human variables. A user operated button switch is closed to initiate transmission of a predetermined duration pulse recognizable by the central office system or PBX as a hook switch flash.

7 Claims, 2 Drawing Figures

FIXED IMPULSE GENERATOR FOR HOOK SWITCH FLASH

FIELD OF THE INVENTION

This invention relates to a telephone central office system or PBX utilizing the hook switch flash technique and, more particularly, to an improved means of providing hook switch flash signals for such a system.

DESCRIPTION OF THE PRIOR ART

Telephone central office systems and PBXs throughout the telephone industry commonly use what is referred to as the hook switch flash technique to transfer a call, place a call on hold or perform some other function to the call established through the system. When it is desired to transfer a call to another telephone in the system, the user momentarily depresses the receiver hook switch to transfer or initiate other control functions.

The existing problem with manual flashing is that the flash impulse generated is solely reliant upon the individual performing the flashing. This makes the reliability of the system dependent on such variables as temperament and user skill.

SUMMARY OF THE INVENTION

It has been discovered that a signal impulse generator energized by a single push button can be used to provide a flash signal that is independent of the user. A timing circuit utilizing a resistance-capacitance network is preferred. The basic timing impulse provided by this RC network can be varied to match different telephone system requirements.

Thus, the present invention provides an improved line circuit for a telephone system utilizing a hook switch flash technique. The line circuit comprises a timing network which includes a capacitor and resistor for providing a pulse of a predetermined duration in response to the closing of a button switch by the user. The circuit of this invention replaces a basic function of the individual user of moving the receiver hook switch up and down but with a very important difference by providing a controlled impulse to the PBX or central office system which will be recognized and utilized without the danger of a call being lost. Normally when a user hook switch flashes, depending on the duration for which they hold the hook switch down, they can completely disconnect their call. Circuits are present in the PBX or central operating system that look at the hook switch signal duration and either recognize it as a hook switch flash and put the circuit on hold or recognize it as a disconnect and dump the call. The usual hook flash signal generated by the user has a wide variance. This contributes to improper telephone system operation. Users that are not accustomed to such a system, and even those that are, tend to have a number of problems using it.

The impulse generator of this invention is designed to eliminate the user variation of hook switch flash as it is presently used. A single button when pressed will activate the circuit providing a fixed pulse. The circuit becomes independent of the button once activated and automatically generates the correct hook switch flash duration. This eliminates the user skill beyond simply pressing the button. The circuit is also advantageous on key systems where hook switch flash would result in button restoration and dropped calls.

BRIEF DESCRIPTION OF THE DRAWING

An example embodiment of the invention will now be described with reference to

DESCRIPTION OF THE PREFERRED EMBODIMENT

Figure 1:
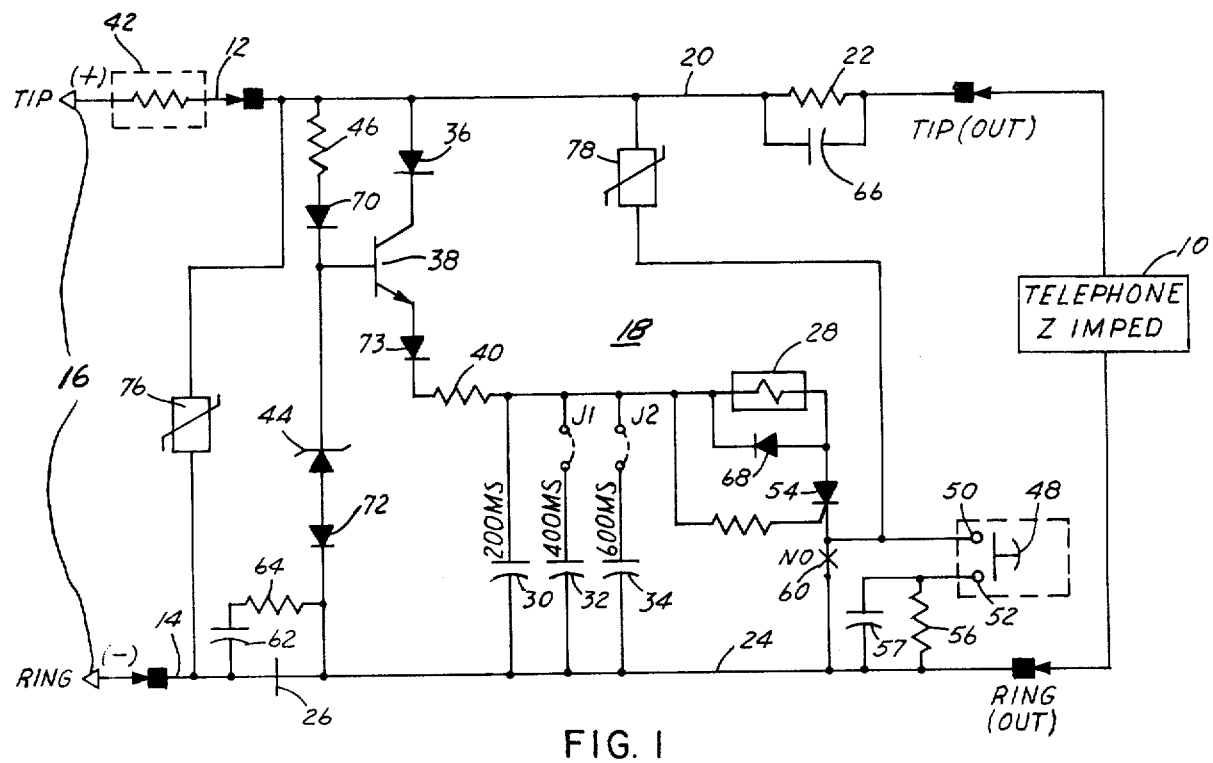
FIG. 1 of the drawings which illustrates a line circuit for a telephone to be used on a central office system or PBX system utilizing the hook switch flash technique.

In FIG. 1, a subscriber's telephone hand set 10 is shown connected to the TIP and RING leads 12 and 14 of a telephone line 16. The telephone line 16 would in turn be connected to a central office, CO, or as an alternative, to a private branch exchange, PBX. The hook switch flash generator 18 is connected between the telephone 10 and the line 16 via conductor 20 connected to TIP lead 12 including series resistor 22 and via conductor 24 connected to RING lead 14 including normally closed relay contacts 26. The hook switch flash generator 18 utilizes a basic RC time constant for its operation. Since critical impulse analyzing is performed by the controlling telephone system, i.e. PBX or CO, the actual time duration of the pulse can be made to vary over a usable range of from 250 ms to about 800 ms. The basic RC timing network is formed by the distributed resistance of relay coil 28 and one or a combination of capacitors 30, 32 or 34 which may be jumper selected as at J1 and J2 providing different pulse durations by changing the capacitance of the circuit.

The firing sequence and specific operation is as follows:

When a voltage of the proper polarity and magnitude is applied to the circuit, (TIP+, RING−, 48 volts dc 30 ma available), the capacitor bank 30, 32 and 34 charges through diode 36 transistor 38 and resistor 40. The charging current is limited only by resistor 40, the forward bias junction drops of transistor 38, diode 36 and the distributed loop resistance 42. The capacitor bank 30-34 will charge rapidly toward the reference level set by Zener diode 44 and resistor 46. When the capacitor bank 30-34 has reached the reference voltage, transistor 38 shuts off. This provides two functions. First, it allows a rapid charge time of the circuit initially and rapid recharging after firing, and, secondly, it removes the low impedance audio shunting path, as will be explained, and leaves only resistor 46 and Zener 44 bridged across the circuit. This is very important later since the circuit of this invention is powered from the line 16 and any constant current drain would cause a significant db loss. With resistor 46 and Zener diode 44 being the only remaining shunt components across line 16 once the RC circuit has charged, the resulting load impedance is greater than 10 K ohms.

Since there is no load to drain the voltage from the capacitor bank, it will remain charged drawing little, if any, current from the line for the duration of the time the telephone set is being used.

The capacitor bank 30-34 having become charged as described, is discharged to provide a timing function by the user depressing hold button 48 closing contacts 50 and 52 completing a circuit from the capacitor bank 30-34 through the coil of relay 28, through SCR 54, contacts 50, 52 and resistor 56 shunted by capacitor 57. On closure of switch contacts 50 and 52, a pulse, of sufficient duration to fire the SCR 54, fires the SCR and closes the normally open contact 60 of relay 28 which latches the relay 28 to the negative side of the capacitor bank.

On actuation of the relay 28, the normally closed contact 26 is opened removing the telephone 10 and the impulse generator 18 from the line. The capacitor bank 30-34 discharges via the coil of relay 28 holding contacts 60 closed and contacts 26 open for a fixed time interval until the voltage across the capacitor bank can no longer sustain the holding voltage on the relay coil and relay 28 drops out opening contacts 60 and closing contacts 26. This removes the SCR from the circuit and reconnects the telephone 10 and impulse generator circuitry 18 to the telephone loop. The capacitor bank 30-34 again recharges from the line as before and the cycle begins again.

Capacitor 62 and resistor 64 form a spark supression network to protect contacts 26 from welding due to the inductive transient generated during switching. Resistor 22 prevents the low impedance circuit of telephone 10 from loading the charge circuit of the impulse generator. Capacitor 66 is a bypass capacitor to bypass audio signals which reduce any audio loss in resistor 22. Diode 36 is polarity insuring and serves to block any reverse current that could damage transistor 38 as well as block the capacitor bank 30-34 against discharge through the low impedance telephone circuitry. Diode 68 is a supression diode for relay 28. Metal oxide varistors 76 and 778 are connected across lines 12 and 14 to supress line transients in excess of 120 volts in several nano seconds providing static protection for the circuit. Diodes 70 and 72 rectify the ring voltage to a voltage of correct polarity and magnitude for circuit operation. Diode 73 is a blocking diode to prevent excessive reverse voltage on the base emitter junction of transistor 38.

Figure 2:
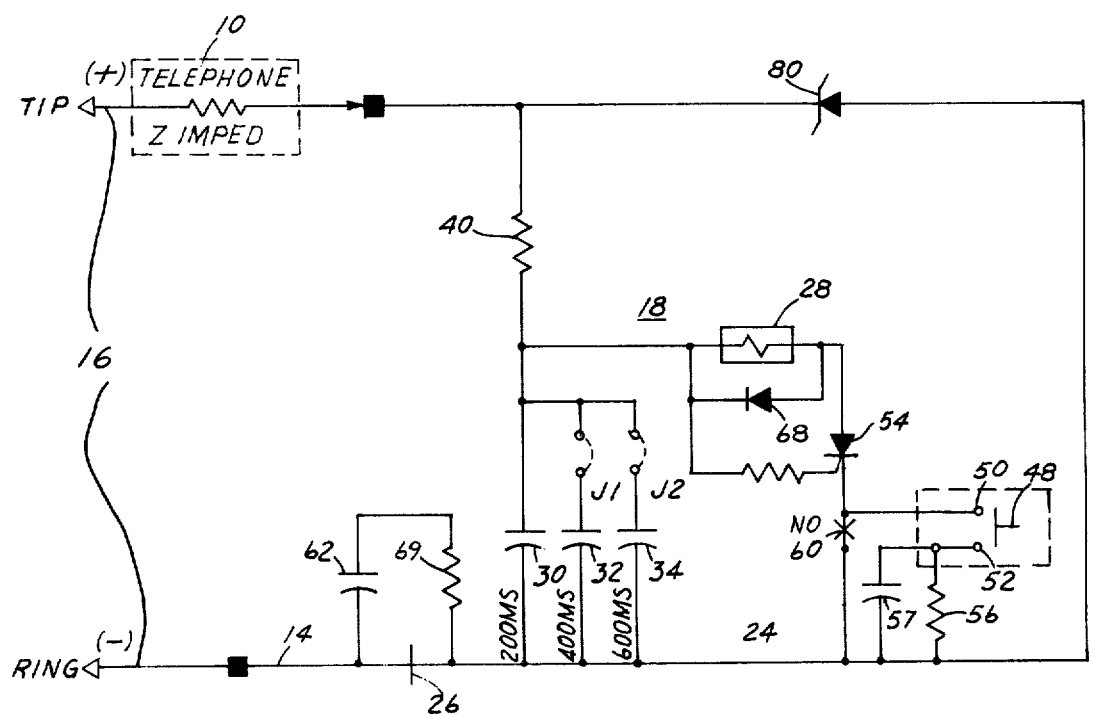
FIG. 2 illustrates another embodiment thereof.

FIG. 2 illustrates another embodiment of the invention wherein the telephone set 10 is series connected and fewer components are required. The capacitor 30 and possibly 32 and 34 are charged from the line via resistor 40 which are selectively discharged via SCR 54 and the coil of relay 28 through normally open contacts 60 of relay 28 on momentary closure of contacts 50 and 52 when button 48 is depressed. The relay 28 latches up through closure of normally open contacts 60 until the capacitor bank 30-34 is discharged and relay 28 falls out. When relay 28 is actuated, normally closed contacts 26 are opened disconnecting the telephone set 10 from the line for a time period predetermined by the discharge interval of the capacitor bank 30-34. Thus, it is possible for a user to depress button 48 to disconnect the telephone set and generate a flash signal of predetermined and uniform duration independent of the user's skill. Zener 80 assures the correct circuit voltage and uniform timing. The hook switch, not shown, in the phone 10 normally isolates the generator circuit from the ringing voltage by being open when the phone is on-hook.

It is apparent from the foregoing that a new and improved hook switch flash generator has been provided. While only the preferred embodiment has been described, as will be apparent to those familiar with the art, certain changes and modifications can be made without departing from the scope of the invention as defined by the following claims.

What is claimed is:

1. A hook switch flash generator circuit, for a telephone system including a telephone line with line voltage and a telephone set comprising:
   an RC timing network including a resistor and capacitor;
   charging means connecting the telephone line to the capacitor and adapted to charge said capacitor;
   a relay means having an actuating coil means connected in series with a solid state switch means having gate means connected in parallel with the said capacitor via a pair of normally open contacts of said relay means; said relay having a pair of normally closed contacts connected in series with the telephone set;
   switch means having normally open contacts connected across the normally open contacts of said relay means; and,
   said gate means being responsive to the closure of the normally open contact means of the switch means to fire said solid state switch means to actuate said relay means, latching said relay means through closure of said normally open contacts of the relay means and opening the normally closed contacts of the relay disconnecting the telephone set from the line for a predetermined period of time sufficient to permit said capacitor to discharge and to allow the relay to unlatch, closing the normally closed contacts reconnecting the telephone set to the line.

2. The generator of claim 1 wherein the charging means includes transistor and diode means connected to insure correct polarity and proper voltage to the generator.

3. The circuit of claim 2 wherein the switch means across the normally open contacts of the relay includes a capacitor in series with contact means.

4. The circuit of claim 1 wherein the switch means across the normally open contacts of the relay includes a capacitor in series with contact means.

5. The circuit of claim 1 wherein the solid state switch means is a silicon controlled rectifier.

6. A method of providing a predetermined hook switch flash in a telephone system including a telephone set which comprises the steps of charging an RC timing circuit connected across the telephone line and discharging the timing circuit in response to the closure of a user operated switch through the actuating coil of a relay means having a pair of normally closed contacts positioned in the telephone line which are latched open during such discharge to completely and electrically disconnect the telephone set from the line to provide zero current flow through the contacts for a predetermined time interval so that the central office can identify the interval as a hook switch flash.

7. A hook switch flash generator circuit for a telephone system including a telephone line with line voltage and a telephone set comprising:
   an RC timing network including a resistor and a capacitor connected across the line;
   charging means having a low impedance path connecting the telephone line to the capacitor and adapted on the capacitor becoming charged to remove the low impedance path from the telephone line;
   relay means having an actuating coil connected in parallel with the timing network through normally open contacts between said capacitor and ground potential, said relay having normally closed contacts connecting a telephone set to one side of the line; and, push button means adapted on closure to close the normally open contacts of the relay and to open the normally closed contacts to completely and electrically disconnect the telephone set from the line to provide zero current flow through the contacts and maintain the relay latched in this condition until the capacitor is discharged sufficient to release the relay and reconnect the telephone set to the line.

* * * * *